(12) United States Patent
Holmberg

(10) Patent No.: US 12,037,223 B2
(45) Date of Patent: Jul. 16, 2024

(54) LOADING A CONTAINER ON A LANDING TARGET

(71) Applicant: ABB Schweiz AG, Baden (CH)

(72) Inventor: Bjorn Holmberg, Uppsala (SE)

(73) Assignee: ABB Schweiz AG, Baden (CH)

( * ) Notice: Subject to any disclaimer, the term of this patent is extended or adjusted under 35 U.S.C. 154(b) by 658 days.

(21) Appl. No.: 17/292,618

(22) PCT Filed: Nov. 14, 2018

(86) PCT No.: PCT/EP2018/081188
§ 371 (c)(1),
(2) Date: May 10, 2021

(87) PCT Pub. No.: WO2020/098933
PCT Pub. Date: May 22, 2020

(65) Prior Publication Data
US 2022/0009748 A1 Jan. 13, 2022

(51) Int. Cl.
*B66C 13/00* (2006.01)
*B66C 13/08* (2006.01)
(Continued)

(52) U.S. Cl.
CPC ............ *B66C 13/085* (2013.01); *B66C 13/46* (2013.01); *G06F 18/22* (2023.01); *G06T 7/593* (2017.01);
(Continued)

(58) Field of Classification Search
CPC ......... B66C 1/101; B66C 1/663; B66C 13/16; B66C 13/085; B66C 13/22; B66C 13/46;
(Continued)

(56) References Cited

U.S. PATENT DOCUMENTS 11,222,299 B1 * 1/2022 Baalke ............... G01C 21/3688
11,348,269 B1 * 5/2022 Ebrahimi Afrouzi ........................
A47L 11/4025
(Continued)

FOREIGN PATENT DOCUMENTS

CN 113192199 A * 7/2021
DE 102020119866 A1 * 2/2021 .............. B25J 13/08
(Continued)

OTHER PUBLICATIONS

International Preliminary Report on Patentability; Application No. PCT/EP2018/081188; Issued: Feb. 23, 2021; 22 Pages.
(Continued)

*Primary Examiner* — Emmanuel M Marcelo
(74) *Attorney, Agent, or Firm* — Whitmyer IP Group LLC

(57) ABSTRACT

A method for loading a container on a landing target on a land vehicle using a container crane including a trolley and a spreader for holding and lifting the container. The method is performed in a container crane control system and includes the steps of: obtaining two-dimensional images of the landing target from a first pair of cameras arranged on the spreader; performing feature extraction based on the two-dimensional images to identify key features of the landing target; generating a point cloud based on the feature extraction, wherein each point in the point cloud contains coordinates in three dimensions; and controlling movement of the container to the landing target based on the point cloud and the identified key features of the landing target.

20 Claims, 3 Drawing Sheets

(51) Int. Cl.
    *B66C 13/46*     (2006.01)
    *G06F 18/22*     (2023.01)
    *G06T 7/593*     (2017.01)

(52) U.S. Cl.
    CPC ............ *B66C 2700/08* (2013.01); *G06T 2207/10028* (2013.01)

(58) Field of Classification Search
    CPC ............ G06T 7/593; G06T 2207/10028; G06F 18/22
    See application file for complete search history.

(56) References Cited

U.S. PATENT DOCUMENTS

| | | | | |
|---|---|---|---|---|
| 2016/0167932 | A1* | 6/2016 | Holmberg | B66C 19/002 382/104 |
| 2017/0055446 | A1* | 3/2017 | Nykamp | B60R 1/00 |
| 2019/0294914 | A1* | 9/2019 | Fevold | G06T 7/593 |
| 2020/0207588 | A1* | 7/2020 | Zanarini | B66C 13/08 |
| 2020/0302207 | A1* | 9/2020 | Perkins | G06V 10/255 |

FOREIGN PATENT DOCUMENTS

| | | | | |
|---|---|---|---|---|
| EP | 2574587 | A1 | 4/2013 | |
| EP | 2724972 | A1 * | 4/2014 | ............ B66C 13/46 |
| EP | 3033293 | B1 * | 10/2017 | ............ B66C 13/08 |
| EP | 3315005 | A1 * | 5/2018 | .......... A01B 69/001 |
| JP | 2013046941 | A | 3/2013 | |
| WO | 2012161584 | A1 | 11/2012 | |
| WO | 2013046941 | A1 | 4/2013 | |
| WO | 2014053703 | A1 | 4/2014 | |
| WO | 2015022001 | A1 | 2/2015 | |
| WO | 2016156667 | A1 | 10/2016 | |
| WO | WO-2022006629 | A1 * | 1/2022 | ............ B66C 13/46 |

OTHER PUBLICATIONS

International Search Report and Written Opinion of the International Searching Authority; Application No. PCT/EP2018/081188; Completed: Jul. 24, 2019; Mailing Date: Aug. 7, 2019; 17 Pages.

* cited by examiner

LOADING A CONTAINER ON A LANDING TARGET

TECHNICAL FIELD

The invention relates to a method, a container crane control system, a computer program and a computer program product for loading a container on a landing target.

BACKGROUND

Container cranes are used to handle freight containers, to transfer containers between transport modes at container terminals, freight harbours and the like. Standard shipping containers are used to transport a great and growing volume of freight around the world. Trans-shipment is a critical function in freight handling. Trans-shipment may occur at each point of transfer and there is usually a tremendous number of containers that must be unloaded, transferred to a temporary stack, and later loaded on to another ship, or back onto the same ship or loaded instead onto another form of transport such as a road vehicle or train.

Traditionally, the container cranes have been controlled in an operator cabin mounted on the container crane. Recently however, container cranes have become remote controlled and even fully automated. This reduces or eliminates the need for crane operators being exposed to inconvenience, danger and even injury.

WO 2015/022001 discloses a method for automatically landing a container on a landing target using a container crane. The container crane comprises a trolley and spreader for holding and lifting the container and a crane control system for controlling movements of said container crane. A distance from the container to the landing target is measured and the container is moved towards the landing target dependent on the measured distance. A plurality of images of the landing target are made using at least one camera mounted on the spreader. The images are processed to identify one or more landing features in the images of the landing target. Distances from the container to the landing target are calculated based on a measurement of distance between the container and the landing features in the images.

Any improvement in how the landing target is identified is of great value.

SUMMARY

It is an object to improve the identification of a landing target for loading a container.

According to a first aspect, it is provided a method for loading a container on a landing target on a land vehicle using a container crane comprising a trolley and a spreader for holding and lifting the container. The method is performed in a container crane control system and comprises the steps of: obtaining two-dimensional images of the landing target from a first pair of cameras arranged on the spreader; performing feature extraction based on the two-dimensional images to identify key features of the landing target; generating a point cloud based on the feature extraction, wherein each point in the point cloud contains coordinates in three dimensions; and controlling movement of the container to the landing target based on the point cloud and the identified key features of the landing target.

The key features may comprise corners of the landing target. The key features may comprise twistlocks of the landing target. The key features may comprise any one or more of a gooseneck of a chassis, a guide structure, a girder, and a beam.

The landing target may be situated higher than surrounding surfaces.

The step of performing feature extraction may comprise identifying a landing target being a surface at a height higher from surrounding surfaces.

The step of obtaining two-dimensional images also comprises obtaining two-dimensional images of the landing target from a second pair of cameras arranged on the spreader. In such a case, the step of performing feature extraction is based also on a two-dimensional image from at least one camera of the second pair.

The first pair of cameras and the second pair of cameras may be arranged along the same side of the spreader.

The method may further comprise the step of: detecting orientation of the landing target based on lines in the two-dimensional images. In such a case, the step of controlling movement is also based on the orientation of the landing target.

The step of performing feature extraction may be based on scale invariant feature transform, SIFT.

The step of generating a point cloud may also be based on stereo image matching based on the two-dimensional images.

The method may further comprise the step of: obtaining additional depth data from a depth detection device. In such a case, the step of generating a point cloud is also based on the additional depth data.

According to a second aspect, it is provided a container crane control system for loading a container on a landing target on a land vehicle using a container crane comprising a trolley and a spreader for holding and lifting the container. The container crane control system comprises: a processor; and a memory storing instructions that, when executed by the processor, cause the container crane control system to: obtain two-dimensional images of the landing target from a first pair of cameras arranged on the spreader; perform feature extraction based on the two-dimensional images to identify key features of the landing target; generate a point cloud based on the feature extraction, wherein each point in the point cloud contains co-ordinates in three dimensions; and control movement of the container to the landing target based on the point cloud and the identified key features of the landing target.

The landing target may be situated higher than surrounding surfaces.

The instructions to obtain two-dimensional images may comprise instructions that, when executed by the processor, cause the container crane control system to obtain two-dimensional images of the landing target from a second pair of cameras arranged on the spreader, and wherein the instructions to perform feature extraction comprise instructions that, when executed by the processor, cause the container crane control system to perform the feature extraction also on a two-dimensional image from at least one camera of the second pair.

The first pair of cameras and the second pair of cameras may be arranged along the same side of the spreader.

According to a third aspect, it is provided a computer program for loading a container on a landing target on a land vehicle using a container crane comprising a trolley and a spreader for holding and lifting the container. The computer program comprises computer program code which, when run on a container crane control system causes the container crane control system to: obtain two-dimensional images of the landing target from a first pair of cameras arranged on the spreader; perform feature extraction based on the two-dimensional images to identify key features of the landing target; generate a point cloud based on the feature extraction, wherein each point in the point cloud contains co-ordinates in three dimensions; and control movement of the container to the landing target based on the point cloud and the identified key features of the landing target.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are based on identifying key features of a landing target from several two-dimensional images using stereo matching and feature extraction. Alternatively, any other type of 3D mapping sensor could be used such as Lidar, time of flight cameras etc. Key features can e.g. be corners of the landing target, twistlocks, etc. A point cloud with points in three dimensions is also generated, based on the identified features, to describe the landing target and the environment around the landing target to improve ability to identify the landing target. By basing the landing target identification on three dimensions, a more reliable identification is achieved, allowing operation to be continued also in conditions with bad visibility.

Figure 1:
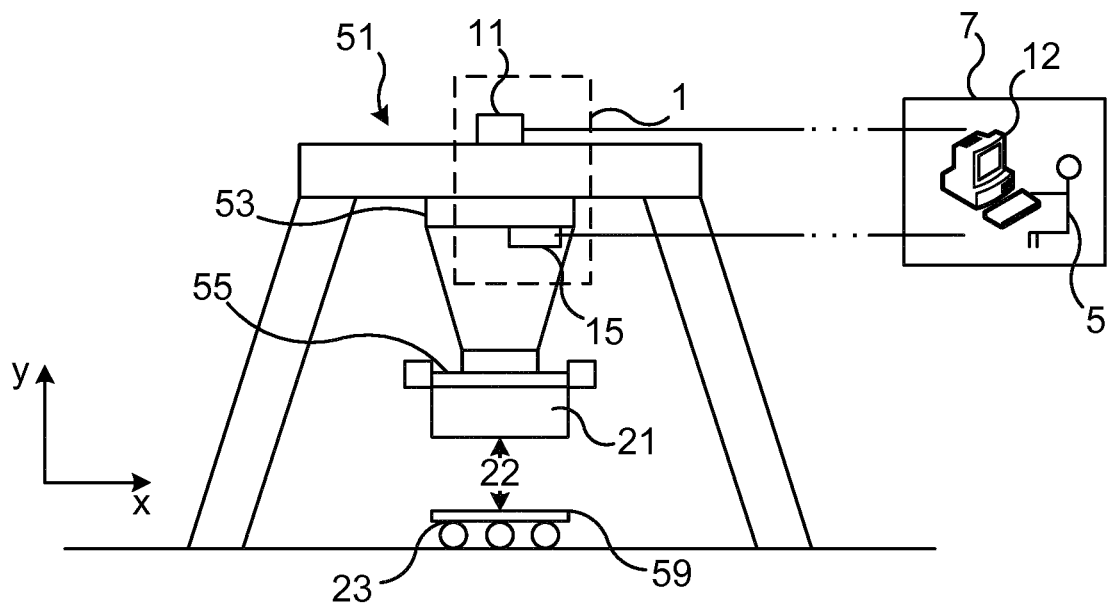
FIG. 1 is a schematic diagram illustrating a container crane environment in which embodiments presented herein can be applied.

FIG. 1 is a schematic diagram illustrating a container crane environment in which embodiments presented herein can be applied. The view of FIG. 1 is along an x-y plane in a Cartesian coordinate system.

A container crane 51 uses a number of powerful electric motors mounted on a spreader 55 and on a trolley 53 to power moving parts and retract or extend cables to lift up or down the spreader 55. The spreader 55 can hold a load 21 in the form of a container. Electric motors are also used to power the movements of the trolley 53 holding the spreader 55, to lift and transport the containers out of the ship and onto a land vehicle 23 or a stack etc. The container crane 51 can be used for loading containers on a ship and/or for unloading containers from a ship to land or on a landing target 59 on a land vehicle 23, e.g. a truck chassis or a train carriage chassis. Moving containers from one position on land to another landing target is also possible.

The width of shipping containers is standardised at 8 ft. (2.436 m), but the height varies, typically between 8 ft. (2.436 m) and 9.5 ft. (2.896 m). The most common standard lengths are 20 ft. (6.096 m) and 40 ft. (12.192 m) long. The 40 ft. (12.192 m) container is very common today and even longer containers up to 53 ft. (16.154 m) long are also in use. International standard dimensions are based on a number of ISO recommendations made between 1968 and 1970, and in particular a recommendation R1161 from January 1970, which made recommendations about dimensions of corner fittings for standard containers. The distances between corner fittings on standard shipping containers are standardised in accordance with the ISO recommendations. The corner fittings, also known as corner castings, include standard openings so that a container may be picked up by inserting a hook of the spreader 55 into each of the four corner fittings at the top of the container 21. The size and shape of the oval-shaped openings are defined in another standard, ISO 1161 from 1984. The same type of corner fittings, e.g. those on the bottom of a container, may be used to lock a container in place in a position (e.g. in a hold or on deck) on board a ship, on a wagon or a chassis.

The spreader 55 is thus used to grip the container 21 e.g. using twistlocks to engage with the standard sized opening in the corner fittings on the container, to lift it, lower it and release it. In this description, the term spreader 55 is used to denote a part of a lifting device that is in direct contact with a container 21. Spreaders 55 are normally designed to handle more than one size of container, typically 20-40 ft. (6.096-12.192 m) or 20-40-45 ft. (6.096-12.192-13.716 m) long containers. Some spreaders 55 may at any time lift and handle one single 40 ft. (12.192 m) or a 45 ft. (13.716 m) container or two 20 ft. (6.096 m) containers. Some spreaders 55 are adjustable in use so that the same spreader 55 can be used to pick up one 20 ft. (6.096 m), or two 20 ft. (6.096 m) containers at a time by adjusting the length of the spreader.

The container crane 51 can thus be used to lift a container 21 up from a ship and land it on a landing target 59, or vice versa. Alternatively, the container crane 51 can be used to transfer the container 21 between the ship and ground or a container stack or any other suitable container movement.

A container crane control system 1 is used to control the operation of the crane 51. In order to enable autonomous control of the crane 51, the container crane control system 1 comprises several cameras (shown in more detail in FIG. 3 and explained below) and/or other depth mapping devices such as Lidar, time of flight cameras, etc., and a control device 15. Optionally, the container crane can be manually controlled e.g. by an operator 5 using an operator terminal 12 in an office 7.

The control device 15 is any suitable control device capable of performing logic operations and can comprise any combination of a central processing unit (CPU), graphics processing unit (GPU), a microcontroller unit (MCU), an application specific integrated circuit (ASIC), a field programmable gate array (FPGA), and discrete logic circuitry, optionally combined with persistent memory (e.g. read only memory, ROM).

Figure 2:
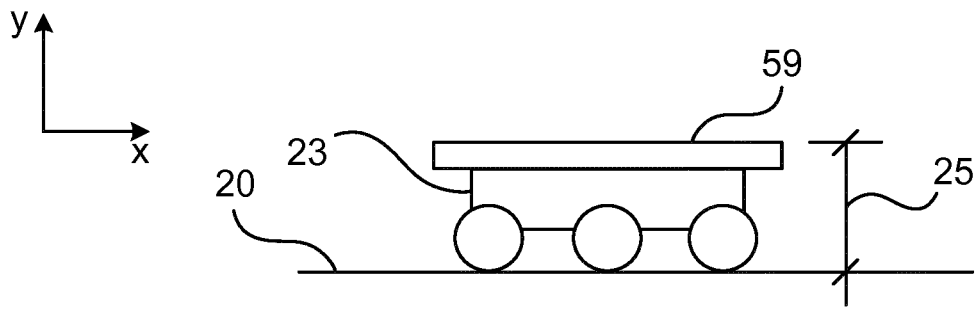
FIG. 2 is a schematic diagram illustrating the landing target and land vehicle of FIG. 1 in more detail according to one embodiment.

FIG. 2 is a schematic diagram illustrating the landing target 59 and land vehicle 23 of FIG. 1 in more detail. The landing target 59 is a top surface or top structure of the land vehicle 23, comprising twistlocks for securing a container. The land vehicle 23 can e.g. be a truck chassis or a train carriage chassis. The landing target 59 is here higher than surrounding surfaces 20 (i.e. ground) at a certain height 25 from the surrounding surfaces 20.

Figure 3:
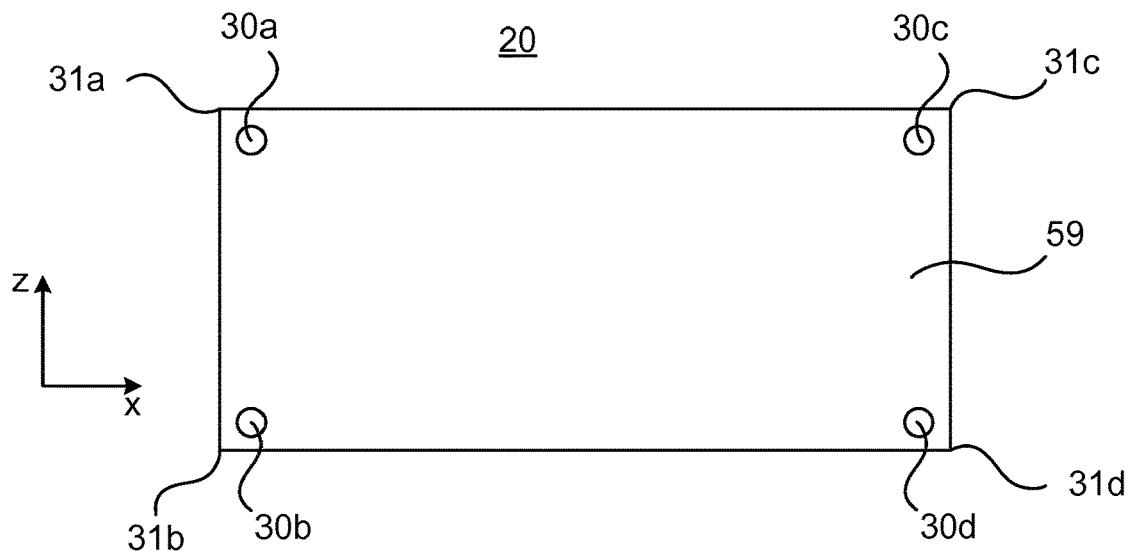
FIG. 3 is a schematic diagram illustrating a view from above of the landing target of FIG. 2 according to one embodiment.

FIG. 3 is a schematic diagram illustrating a view from above of the landing target 59 of FIG. 2. The view is along a z-x plane in the same coordinate system as for FIG. 1. Hence, the view of FIG. 3 is from above whereas the view in FIG. 1 is from the front (or back). The four corners 31a-d of the landing target 59 can be seen here. Moreover, the landing target 59 comprises four twistlocks 30a-d, respectively provided at the four corners 31a-d. The twistlocks are used to secure the container on the landing target 59. Alternatively the landing target can have fewer than four twistlocks but instead have other structures used hold the container in position on the landing target.

Figure 4:
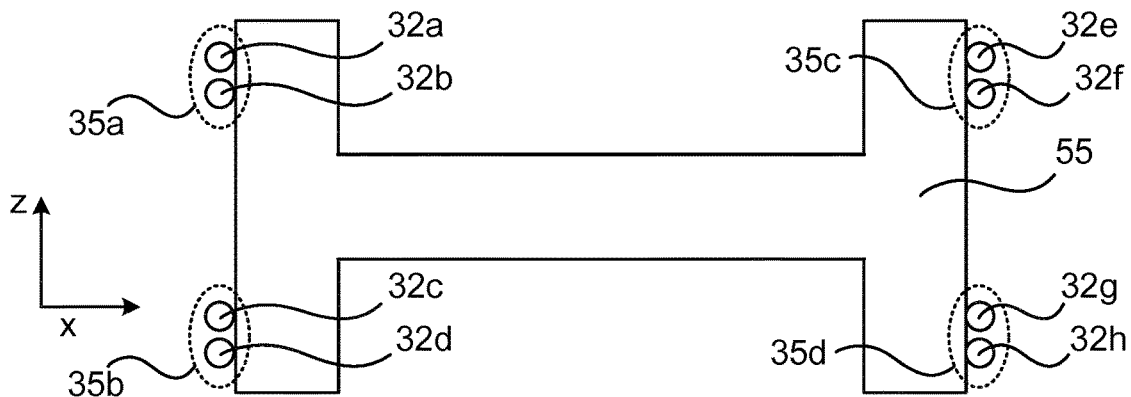
FIG. 4 is a schematic diagram illustrating a view from below of the spreader of FIG. 1 according to one embodiment.

FIG. 4 is a schematic diagram illustrating a view from below of the spreader 55 of FIG. 1 according to one embodiment. There are here eight cameras 32a-h provided for identification of landing target, etc. There could be fewer or more cameras as long as there are at least two cameras. Alternatively there could be an addition of other depth mapping devices such as Lidar, time of flight cameras, etc.

The cameras are provided in pairs. Specifically, a first pair 35a comprises the first camera 32a and the second camera 32b. A second pair 35b comprises the third camera 32c and the fourth camera 32d. A third pair 35c comprises the fifth camera 32e and the sixth camera 32f. A fourth pair 35d comprises the seventh camera 32g and the eighth camera 32h.

The term end side is to be interpreted as one of the shorter sides of the spreader. Hence, the first pair 35a of cameras and the second pair 35b of cameras are provided on one end of the spreader 55, while the third pair 35c of cameras and the fourth pair 35d of cameras are provided on the other end of the spreader 55.

Figure 5:
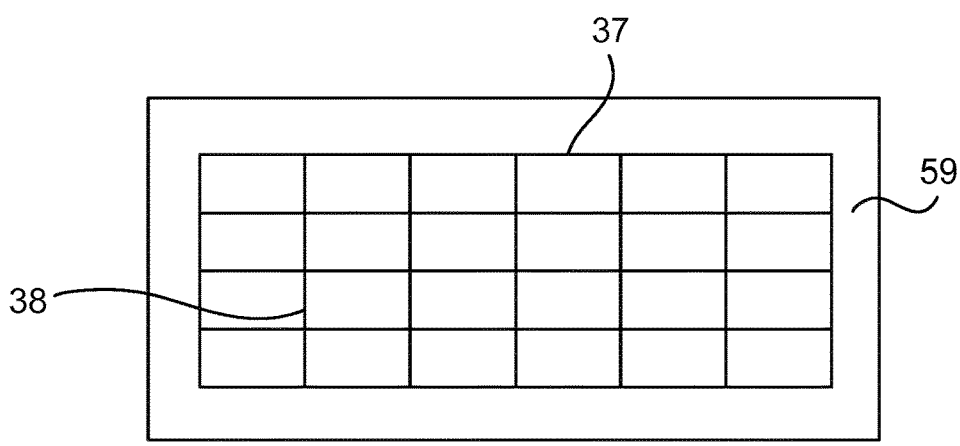
FIG. 5 is a schematic diagram illustrating lines of the landing target of FIG. 1.

FIG. 5 is a schematic diagram illustrating lines of the landing target 59 of FIG. 1 in more detail according to one embodiment. The landing target 59 can comprise lines, including horizontal lines 37 and/or vertical lines 38. The lines can form part of the structure of the landing target 59 or underlying chassis, which are predominately provided along (horizontally in FIG. 5) or across (vertically in FIG. 5) the landing target 59. By analysing the lines in images captured by the cameras and in the depth map of the landing target, the container crane control system can accurately adjust skew alignment of the container when placed on the landing target 59.

Figure 6:
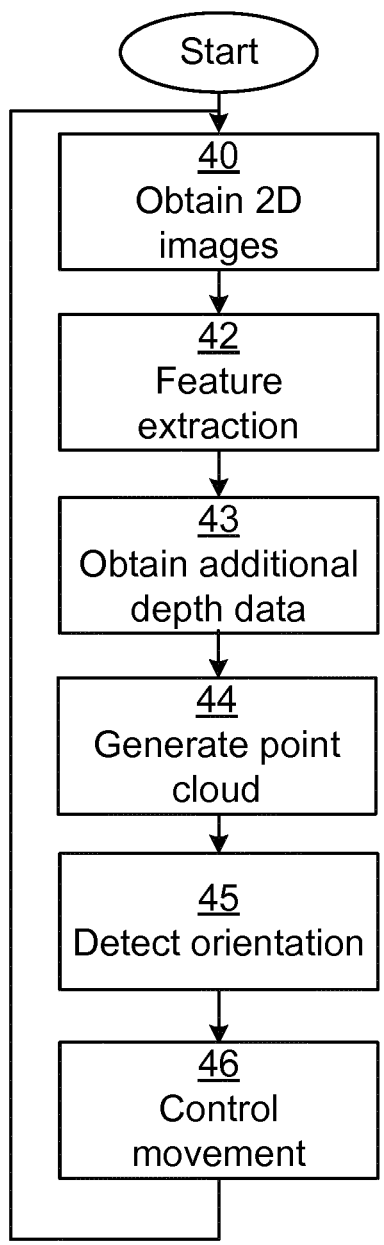
FIG. 6 is a flow chart illustrating a method for loading a container on a landing target on a land vehicle using a container crane comprising a trolley and a spreader for holding and lifting the container.

FIG. 6 is a flow chart illustrating a method for loading a container on a landing target on a land vehicle using a container crane comprising a trolley and a spreader for holding and lifting the container. The method is performed in the container crane control system for automated control of the container crane.

In an obtain 2D images step 40, the container crane control system obtains two-dimensional images of the landing target from a first pair (e.g. any of the pairs 35a-d of FIG. 4) of cameras arranged on the spreader.

Optionally, this comprises obtaining two-dimensional images of the landing target from a second pair of cameras arranged on the spreader. The first pair of cameras and the second pair of cameras can be arranged along the same end side of the spreader. The term end side is to be interpreted as one of the shorter sides of the spreader.

In a feature extraction step 42, the container crane control system performs feature extraction based on the two-dimensional images to identify key features of the landing target. The key features can be corners of the landing target. Alternatively or additionally, the key features can comprise twistlocks of the landing target. Optionally, other key features are identified, e.g. any one or more of a gooseneck of a chassis, guide structures, girders, beams, etc. When more key features are extracted, this increases the reliability for subsequent loading of the container on the landing target.

The feature extraction can comprise identifying a landing target being a surface at a height higher from surrounding surfaces. The difference in height is significant, typically in the region of 1.2 metres, making this identification robust, even in poor weather conditions. Of course, the height difference can vary greatly from the example mentioned here.

As shown in FIG. 2, the landing target can be situated higher than surrounding surfaces, which simplifies the identification of the landing target in the feature extraction, since this is based on at least two cameras and thus result in a depth dimension.

When a two-dimensional image from at least one camera of the second pair is available, this is also used in the feature extraction. The use of additional cameras improves the ability to identify the depth dimension.

The feature extraction is based on any suitable algorithm, e.g. scale invariant feature transform (SIFT) or similar.

In an optional obtain additional depth data step 43, additional depth data from a depth detection device is obtained. The depth detection device can e.g. be in the form of Lidar, time of flight cameras, etc.

In a generate point cloud step 44, the container crane control system generates a point cloud based on the feature extraction, wherein each point in the point cloud contains co-ordinates in three dimensions. Each point may also contain light values in one or more colours, e.g. RGB (Red, Green and Blue) light values. In one embodiment, more points are generated in the point cloud around at least one identified feature. The point cloud can be made more dense around the identified feature(s), since the features are of particular interest when landing a container. For instance, when identifying corners of a chassis on which to land a container, it is of great benefit to generate more density in the point cloud around the corners of the chassis, where the height difference to ground is significant. On the other hand, once the location of ground is identified around the chassis, more details of the ground do not help in landing a container. In this way, these regions of the landing target are better covered in the point cloud, making the landing more secure and robust. This is of great benefit, e.g. in poor weather conditions.

The point cloud can also be derived using stereo image matching based on the two-dimensional images. This results in more dense depth maps than if only the feature extraction is used. The stereo image matching can e.g. be based on block matching.

Optionally, the additional depth data received in step 43 may be fused with the camera images to yield even more reliable point cloud data. Hence, the point cloud can also be based on the additional depth data to thereby obtain an even more extensive and accurate point cloud.

In a detect orientation step 45, the container crane control system detects orientation of the landing target based on lines in the two-dimensional images, see FIG. 5 and corresponding text above. This improves skew control when controlling the container in relation to the landing target.

In a control movement step 46, the container crane control system controls movement of the container to the landing target based on the point cloud and the identified key features of the landing target. When available, movement is controlled also based on the orientation of the landing target.

The method loops to provide continued feedback of position in relation to the landing target and appropriate movement control.

By using three-dimensional data in the feature extraction and the point cloud, a more reliable identification of the landing target is achieved. Moreover, due to the height difference (25 of FIG. 2) between the landing target and ground, the three-dimensional data greatly increases reliability of the identification. This allows the container crane control system to continue operation also in conditions of limited visibility, such as in rain, snow, lightning, etc.

A corresponding method can be applied for picking up a container, where instead of a landing target, the key features of a container to be picked up are identified.

Figure 7:
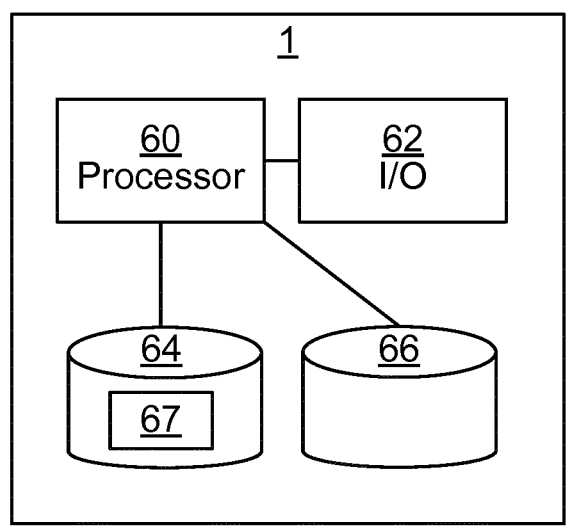
FIG. 7 is a schematic diagram illustrating components of the container crane control system of FIG. 1.

FIG. 7 is a schematic diagram illustrating components of the container crane control system 1 of FIG. 1. A processor 60 is provided using any combination of one or more of a suitable central processing unit (CPU), graphics processing unit (GPU), multiprocessor, microcontroller, digital signal processor (DSP), application specific integrated circuit (ASIC), etc., capable of executing software instructions 67 stored in a memory 64, which can thus be a computer program product. The processor 60 can be configured to execute the method described with reference to FIG. 6 above.

The memory 64 can be any combination of random-access memory (RAM) and read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of random-access memory (RAM) and read only memory (ROM).

The container crane control system 1 further comprises an I/O interface 62 for communicating with other external entities. Optionally, the I/O interface 62 also includes a user interface.

Other components of the container crane control system 1 are omitted in order not to obscure the concepts presented herein.

Figure 8:
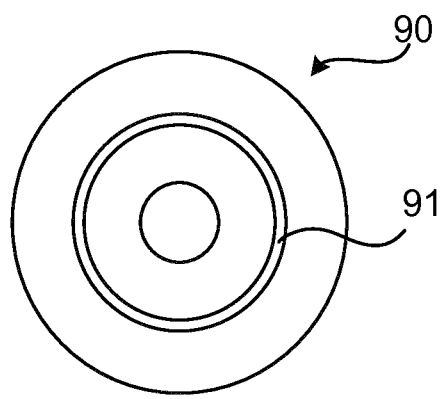
FIG. 8 shows one example of a computer program product comprising computer readable means.

FIG. 8 shows one example of a computer program product comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 67 of FIG. 7. While the computer program 91 is here schematically shown as a track on the depicted optical disk, the computer program can be stored in any way which is suitable for the computer program product, such as a removable solid-state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for loading a container on a landing target on a land vehicle using a container crane including a trolley and a spreader for holding and lifting the container, the method being performed in a container crane control system and comprising the steps of:
   obtaining two-dimensional images of the landing target from a first pair of cameras arranged on the spreader;
   performing feature extraction based on the two-dimensional images to identify key features of the landing target;
   generating a point cloud based on the feature extraction, wherein each point in the point cloud contains coordinates in three dimensions; and
   controlling movement of the container to the landing target based on the point cloud and the identified key features of the landing target.

2. The method according to claim 1, wherein the key features comprise corners of the landing target.

3. The method according to claim 2, wherein the landing target is situated higher than surrounding surfaces.

4. The method according to claim 2, wherein the step of performing feature extraction includes identifying the landing target being a surface at a height higher than surrounding surfaces.

5. The method according to claim 1, wherein the landing target is situated higher than surrounding surfaces.

6. The method according to claim 1, wherein the step of performing feature extraction includes identifying the landing target being a surface at a height higher than surrounding surfaces.

7. The method according to claim 1, wherein the step of generating the point cloud includes generating more points in the point cloud around at least one identified feature.

8. The method according to claim 1, wherein the step of obtaining two-dimensional images also includes obtaining two-dimensional images of the landing target from a second pair of cameras arranged on the spreader, and wherein the step of performing feature extraction is based also on a two-dimensional image from at least one camera of the second pair.

9. The method according to claim 8, wherein the first pair of cameras and the second pair of cameras are arranged along the same side of the spreader.

10. The method according to claim 1, further comprising the steps of:

detecting orientation of the landing target based on lines in the two-dimensional images;

and wherein the step of controlling movement is also based on the orientation of the landing target.

11. The method according to claim 1, wherein the step of performing feature extraction is based on scale invariant feature transform, SIFT.

12. The method according to claim 1, wherein the step of generating the point cloud is also based on stereo image matching based on the two-dimensional images.

13. The method according to claim 1, further comprising the steps of:

obtaining additional depth data from a depth detection device;

and wherein the step of generating the point cloud is also based on the additional depth data.

14. The method according to claim 1, wherein both cameras of the first pair that provides the two-dimensional images are arranged proximate to each other in the same location on the spreader.

15. A container crane control system for loading a container on a landing target on a land vehicle using a container crane including a trolley and a spreader for holding and lifting the container, the container crane control system comprising:

a processor; and a memory storing instructions that, when executed by the processor, cause the container crane control system to:

obtain two-dimensional images of the landing target from a first pair of cameras arranged on the spreader;

perform feature extraction based on the two-dimensional images to identify key features of the landing target;

generate a point cloud based on the feature extraction, wherein each point in the point cloud contains coordinates in three dimensions; and control movement of the container to the landing target based on the point cloud and the identified key features of the landing target.

16. The container crane control system according to claim 15, wherein the landing target is situated higher than surrounding surfaces.

17. The container crane control system according to claim 15, wherein the instructions that cause the container crane control system to obtain two-dimensional images includes instructions that, when executed by the processor, cause the container crane control system to obtain two-dimensional images of the landing target from a second pair of cameras arranged on the spreader, and wherein the instructions that cause the container crane control system to perform feature extraction include instructions that, when executed by the processor, cause the container crane control system to perform the feature extraction also based on a two-dimensional image from at least one camera of the second pair.

18. The container crane control system according to claim 17, wherein the first pair of cameras and the second pair of cameras are arranged along the same side of the spreader.

19. A computer program for loading a container on a landing target on a land vehicle using a container crane including a trolley and a spreader for holding and lifting the container, the computer program comprising computer program code which, when run on a container crane control system causes the container crane control system to:

obtain two-dimensional images of the landing target from a first pair of cameras arranged on the spreader;

perform feature extraction based on the two-dimensional images to identify key features of the landing target;

generate a point cloud based on the feature extraction, wherein each point in the point cloud contains coordinates in three dimensions; and control movement of the container to the landing target based on the point cloud and the identified key features of the landing target.

20. A computer program product comprising a computer program for loading a container on a land target on a land vehicle using a container crane including a trolley and a spreader, the computer program including computer program code which, when run on a container crane control system, causes the container crane control system to:

obtain two-dimensional images of the landing target from a first pair of cameras arranged on the spreader;

perform feature extraction based on the two-dimensional images to identify key features of the landing target;

generate a point cloud based on the feature extraction, wherein each point in the point cloud contains coordinates in three dimensions;

control movement of the container to the landing target based on the point cloud and the identified key features of the landing target; and a computer readable means on which the computer program is stored.

* * * * *